Nov. 8, 1966 C. S. MERTLER 3,284,599
THERMOSTATIC SWITCH WITH HEAT COLLECTOR MEMBER
Filed Feb. 6, 1964 2 Sheets-Sheet 1

INVENTOR.
CHARLES S. MERTLER
BY Woodling, Krost,
Granger and Rust
ATTORNEYS

Nov. 8, 1966   C. S. MERTLER   3,284,599
THERMOSTATIC SWITCH WITH HEAT COLLECTOR MEMBER
Filed Feb. 6, 1964   2 Sheets-Sheet 2

INVENTOR.
CHARLES S. MERTLER
BY
ATTORNEYS

United States Patent Office 3,284,599
Patented Nov. 8, 1966

3,284,599
THERMOSTATIC SWITCH WITH HEAT COLLECTOR MEMBER
Charles S. Mertler, Mansfield, Ohio, assignor to Stevens Manufacturing Company, Inc., a corporation of Ohio
Filed Feb. 6, 1964, Ser. No. 342,973
10 Claims. (Cl. 200—136.5)

The invention relates in general to thermostatic switches and particularly to a combination thermostatic switch and connecting plug for a household heating appliance.

The invention may be incorporated in a thermostatic switch for an electrical heater to heat a utensil having a flat bottom surface portion, said thermostatic switch including a housing with an upper surface portion having an aperture therein, a heat collector member of good heat conductive metal carried by a base within the housing and extending through the aperture to a level slightly above the upper surface portion, a bimetallic member carried by said base contiguous to and below said heat collector member and positioned within said housing, first and second contacts relatively moved by movement of said bimetallic member, conductor means to connect said contacts to a voltage source to control energization to said electrical heater element, and spring means disposed to urge said heat collector member into heat transmitting relationship with said bottom surface portion of said utensil whereby heat from said utensil collected by said heat collector member and conducted to said bimetallic member controls the opening and closing temperatures of said contacts.

Thermostatic connecting plugs have previously been used for household heating appliances but in many cases they have incorporated an extending probe extending therefrom which is generally parallel to the connecting jacks of the plug which make electrical connection to terminal pins of the eletcrical heater of the appliance. In other cases the probe is connected to the heating appliance and fits within a recess in the connecting plug. These probes are devices which sense or transmit heat from the appliance to the thermostatic plug and this sensed heat is used for control of the temperature of the appliance. One advantage of a thermostatic connecting plug is that the plug may be disconnected from the heating appliance so that it may be washed and many of these heating appliances, such as electric frying pans for example, are completely immersible or at least partially immersible in water so that they may be more easily and effectively cleaned. The electrical parts on the electrical appliance are hermetically sealed to prevent entrance of moisture to permit such washing. The thermostatic connecting plug generally has a two-wire electrical cable for connection to an electrical utility outlet or voltage source and a thermostatic control within the thermostatic connecting plug opens and closes contacts in response to heat transmitted by the probe to control the electrical energy to the heating appliance.

The thermostatic connecting plug of such prior art units was frequently placed in a kitchen utensil drawer, for example, for storage of this connecting plug and supply cable during intervals of non-use. Such drawer storage of the thermostatic connecting plug meant that the thermostatic plug was subject to frequent impacts and jarring and bending movements as the housewife would move the connecting plug around the drawer searching for other items. This meant that the extending probe on this thermostatic plug was in a very exposed and easily damaged position. The probe might become bent or broken. If the probe became broken it was, of course, useless. If it became bent it often would not fit within the socket intended for the probe on the heating appliance. Even a slight bend could result in a radical change in calibration of the thermostat.

Conversely, if the probe was mounted on the heating appliance to be received within a socket in the thermostatic connecting plug, then similar problems resulted. The electric frying pan, for example, was often rather large and too large to be placed completely within one of the compartments of the usual kitchen sink. This meant that the frying pan had to be dipped into the water at an angle and then turned around to various attitudes in order to properly wash the frying pan. The probe extending from the frying pan then could easily be banged against the side of the kitchen sink or against the faucet spout and this could again bend or break this extending probe.

Still further, with such an extending probe upon either the heating appliance or the thermostatic connecting plug, there was always a mating or complementary socket in the plug or the heating appliance. This socket could not be easily cleaned because of the fact that it was rather inaccesible to the housewife and any food particles or other dirt getting into the socket could not effectively be cleaned out. This food, dirt or other foreign objects in the socket then would prevent proper transmission of heat from the probe to the socket or vice-versa and, hence, this often changed the calibration of the thermostatic connecting plug in its intended function of controlling the operating temperature of the heating appliance. Further, if the probe became bent, it often would not be receivable within the socket to thus destroy the usefulness of the entire combination. If the thermostatic connecting plug with a probe was of the type which depended upon radiation of heat from the probe to the socket, then the dirt or other foreign objects within the socket could act as an insulation to destroy the effectiveness of this heat radiation and, hence, change the calibration of the thermostatic connecting plug. If the probe and socket combination were of the type which required an actual conductive transmission of heat, then the dirt or other foreign objects primarily within the socket would be even more damaging in their effect of changing the calibration of the thermostatic connecting plug. Also, if the probe became bent, then this would definitely change the surface area of contact upon which the conduction of heat depended and this, again, would change the calibration of the thermostatic connecting plug.

Accordingly, an object of the invention is to provide a thermostatic connecting plug and heating appliance combination which overcomes the deficiencies outlined above.

Another object of the invention is to provide a thermostatic connecting plug and heating appliance without any probe on either the plug or the appliance.

Another object of the invention is to provide a thermostatic connecting plug and utensil with which used wherein a rugged heat transmitting member from the appliance to the thermostatic connecting plug is provided.

Another object of this invention is to provide a thermostatic connecting plug and heating appliance wherein both may be readily cleaned so that the housewife will maintain both in a clean condition for proper operation and continued proper calibration of the thermostatic connecting plug.

Another object of the invention is to provide a thermostatic connecting plug wherein a heat transmitting member is provided which cannot become bent or broken.

Another object of the invention is to provide a thermostatic connecting plug for a heating appliance wherein very good heat transmission is provided from the heating appliance to a bimetallic member within the thermostatic connecting plug.

Another object of the invention is to provide a thermostatic connecting plug having a heat transmitting member on one side of the plug and also having an adjusting knob for control of temperature on the same side of this thermostatic connecting plug.

Another object of the invention is to provide a thermostatic connecting plug which senses the actual temperature of the bottom of an electrical heating appliance such as an electrical frying pan.

Other objects and a fuller understanding of this invention may be had by referring to the following description and claims, taken in conjunction with the accompanying drawings, in which:

Figure 1:
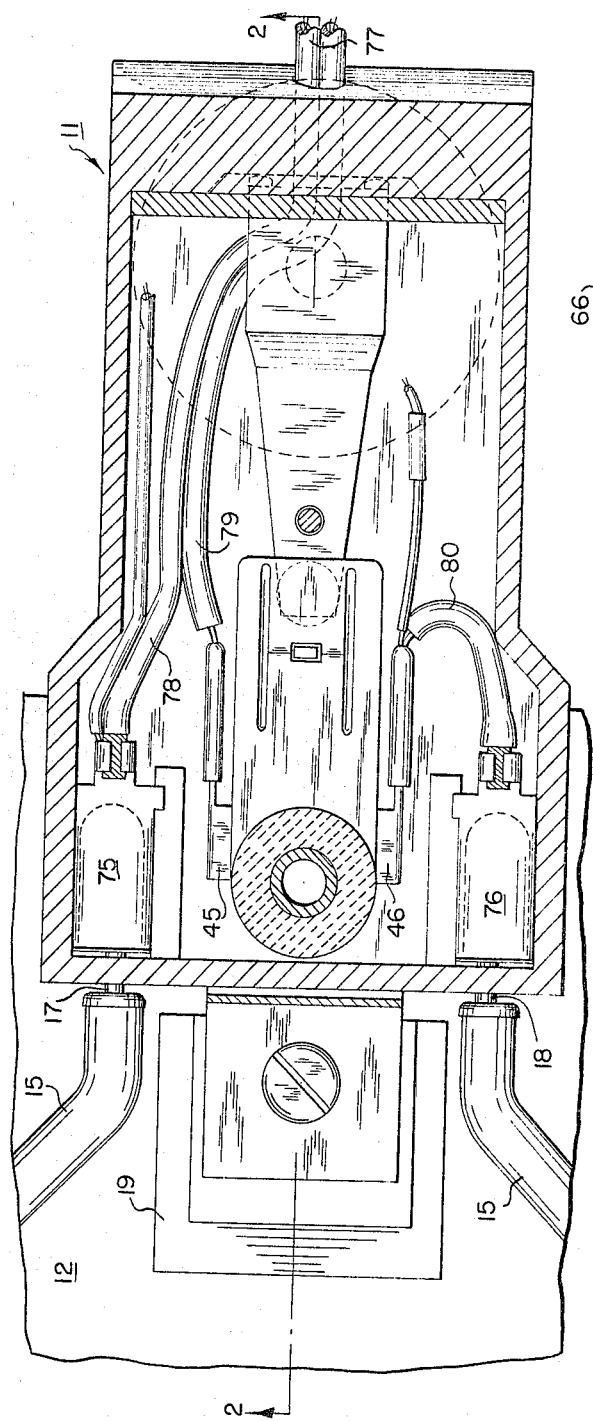
FIGURE 1 is a bottom sectional view of the heating appliance on a line 1—1 of FIGURE 2 of the thermostatic connecting plug.
Figure 2:
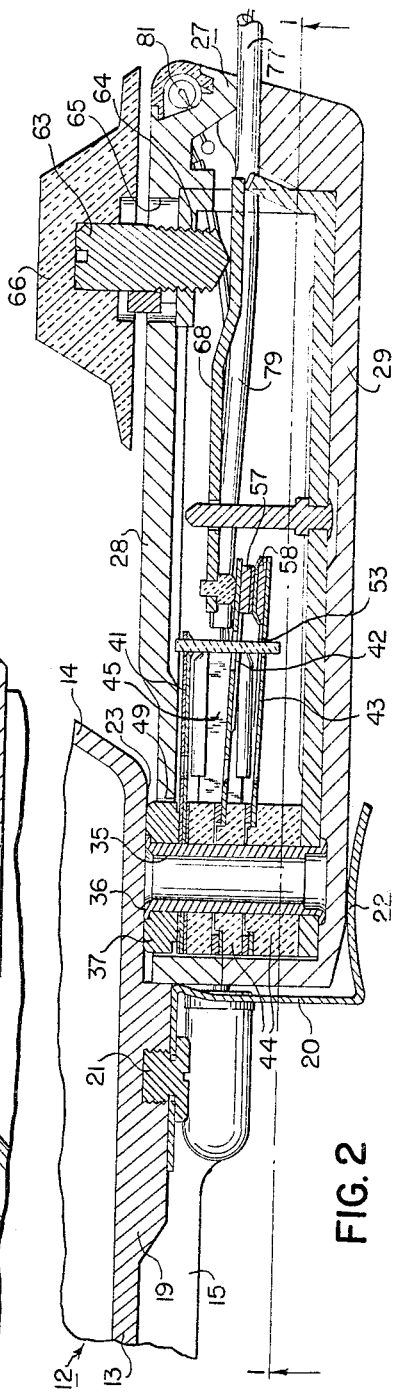
FIGURE 2 is a sectional view on line 2—2 of FIGURE 1.
Figure 3:
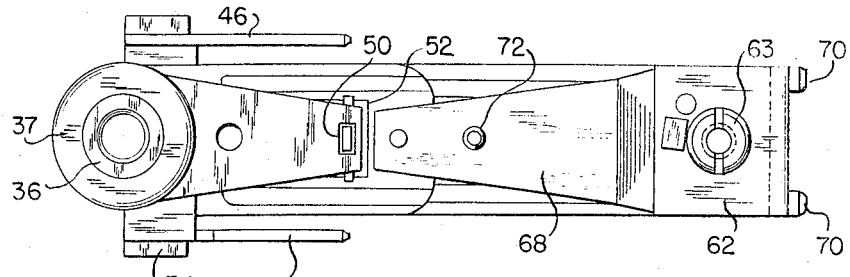
FIGURE 3 is a plan view of the thermostatic switch as removed from the housing shown in FIGURES 1 and 2.
Figure 4:
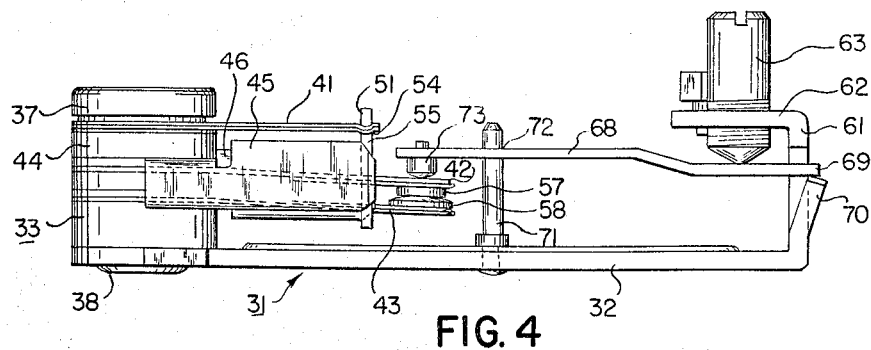
FIGURE 4 is a side elevation view of the thermostatic switch of FIGURE 3.
Figure 5:
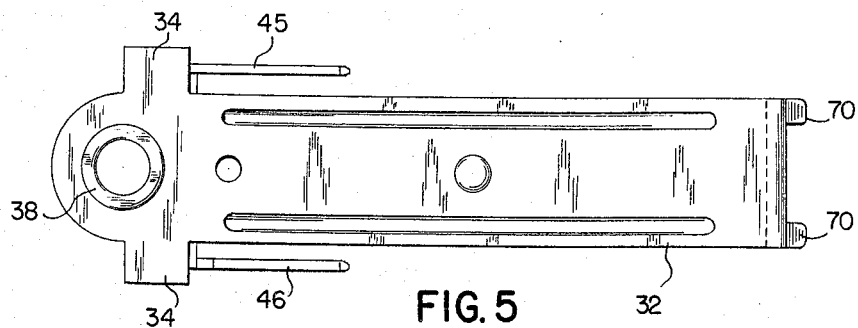
FIGURE 5 is a bottom plan view of the thermostatic switch.
Figure 6:
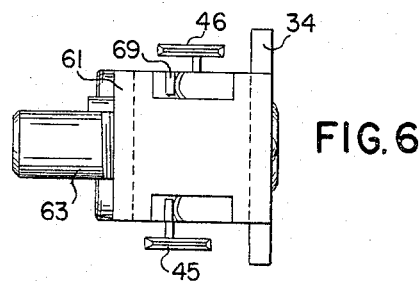
FIGURE 6 is an end view of the thermostatic switch.

FIGURES 1 and 2 shows a thermostatic connecting plug 11 for use with a utensil or household heating appliance 12. The household heating appliance 12 is shown only partially and may take many forms, the form shown herein is an electrical frying pan having a bottom 13 and a sidewall 14. An electrical heater element is shown as a sheathed heater element 15 fixed to the bottom 13 of the appliance 12. The appliance 12 may be made of cast aluminum, for example, and the heater element 15 may be a resistance wire heater element electrically insulated from a tubular boss which is the sheath and which is cast integrally with the bottom wall 13 of the appliance 12. This electrical heater element 15 may make a loop around the bottom wall 13 near the periphery of the sidewall 14 as is customary practice.

The electrical heater element 15 has first and second parallel terminal pins 17 and 18 which extend parallel to the bottom 13 and extend outwardly toward the sidewall 14. A thickened boss 19 is cast integrally with the bottom wall 13 and a Z-shaped cantilever spring 20 is fixed to this boss 19 by a screw 21. The spring 20 has an outer leg 22 extending outwardly generally in the same direction and parallel to and between the terminal pins 17 and 18. A flat bottom surface portion 23 is provided on the bottom wall 13 and disposed outwardly of the boss 19 and intermediate between the terminal pins 17 and 18.

The thermostatic connecting plug 11 includes a housing 27 made of insulating material and which may be formed of upper and lower insulated housing halves 28 and 29. A thermostatic switch 31 is mounted within the housing 27 and this thermostatic switch is better shown in FIGURES 3–6 removed from the housing 27. The thermostatic switch 31 includes a metal base 32. A stack 33 is fixed on the forward end of the metal base 32. The metal base 32 has fixed ears 34 extending therefrom to provide stable mounting of the thermostatic switch 31 within the housing 27. The stack 33 is mounted to the base 32 by a hollow rivet 35 which has a small head 36 engaging a heat collector washer 37. This heat collector washer is a member of a metal of good heat conductivity such as copper or aluminum. The lower end of the rivet 35 is headed over the base 32 at 38.

The stack 33 includes first, second and third cantilever blades 41, 42 and 43 having a mounting end within the stack 33. Insulating washers 44 also form part of the stack to relatively insulate the cantilever blades 42 and 43. A terminal 45 is in the stack in electrical connection with the second cantilever blade 42 and another terminal 46 is in the stack 33 in electrical connection with the third cantilever blade 43.

The upper housing half 28 has a circular aperture 49 therein through which the heat collector washer 37 extends slightly. This heat collector washer 37 extends through this aperture 49 a distance in the order of ¼ to ¹⁄₁₀ the diameter of this washer 37.

The first cantilever blade 41 is bimetallic and the outer end thereof has a small aperture 50 receiving the tip of an insulator push link 51. This push link 51 goes through an enlarged aperture 52 in the second cantilever blade 42. Another tip extension of the insulator push link 51 extends through a small aperture 53 in the third cantilever blade 43. Rounded projections 54 are provided on the cantilever blade 41 on each lateral side of the aperture 50 in order to engage shoulders 55 on the insulator push link 51 with only a line contact. A similar construction is provided for the engagement between the push link 51 and the third cantilever blade 43. This line contact engagement minimizes friction as the cantilever blade 41 moves downwardly with heat to move the cantilever blade 43 downwardly.

First and second cooperating contacts 57 and 58 are provided on the second and third cantilever blades 42 and 43, respectively. The second cantilever blade 42 is normally biased upwardly and the third cantilever blade 43 is also normally biased upwardly by the stack mounting thereof and blade 43 is pushed downwardly by the bimetallic blade 41.

The base 32 has an upstanding leg 61 and a return leg 62 forming a U-shaped end on the rear end of this base 32. An adjusting shaft 63 has male threads threaded in a tapped aperture 64 in the return leg 62 and the axis of this shaft 63 is parallel to the axis of the stack 33. The adjusting shaft or screw 63 extends through an aperture 65 in the upper housing half 28 and a manual adjusting knob 66 is fixed on the exterior end of this adjusting screw 63. The knob 66 and the upper housing half 28 may have indicia, not shown, to indicate the temperature to which the thermostatic switch 31 is adjusted.

A motion amplifying lever 68 has a forked end 69 fulcrumed on lugs 70 lanced from the upstanding leg 61 of the base 32. The upper end of the lugs 70 are rounded to provide a point contact or short line contact for the lever forked end 69. A guide stud 71 is fixed on the base 32 with an axis parallel to the axis of the stack 33 and this guide stud or pin 71 extends through an aperture in the lever 68 to guide this lever in movements generally parallel to the axis of the stack 33. The adjusting screw 63 engages the lever 68 at a point close to the fulcrum lugs 70 and thus rotary movement of the screw 63 provides motion amplified movement at the forward end of this lever 68. The forward end of the lever 68 carries an insulator tip 73 which bears against the rear face of the second cantilever blade 42. This cantilever blade 42 is biased by its mounting to urge upwardly against the insulator tip 73 and, hence, adjustment movements of the adjusting screw 63 will adjust the position of the second contact 57 for relative adjustment of the contacts 57 and 58.

First and second female connector jacks 75 and 76 are provided in the forward end of the housing 27 and are disposed parallel to each other to receive the first and second terminal pins 17 and 18 of the heating appliance 12. When the thermostatic connecting plug 11 is pushed onto the heating appliance 12, this means that the terminal pins 17 and 18 are received within the connector jacks 75 and 76. At the same time, the outer leg 22 of the cantilever spring 20 engages the lower side of the housing 27 and urges the heat collector washer 37 into firm heat conducting relationship with the flat bottom surface portion 23 of the heating appliance 12. This provides good heat transmission from the bottom wall 13 of the appliance 12 through the heat collector washer 37 to the bimetallic blade 41. With this heat transmission, the bimetallic blade 41 is rapidly brought to the temperature of the bottom wall 13 and thus the thermostatic connecting plug 11 is one which rapidly responds to temperature of the appliance 12.

A two-wire supply cable 77 may have a connector plug, not shown, for connection to an electrical utility outlet of a voltage source. This supply cable 77 has first and second conductors 78 and 79 with the first conductor 78 connected to the first connector jack 75. The electrical current flows through the looped electrical heater element 15 to return to the second connector jack 76. Here a conductor 80 connects connector jack 76 to the terminal 46 which is connected through the contacts 58 and 57 to the terminal 45. This terminal 45 is connected to the second conductor 79 of the two-wire supply cable 77. A neon lamp 81 in the rear of the housing 27 may be connected across the conductors 78 and 79 to show that power is available or, as shown, may be connected across the heater element 15 to show when this heater element 15 is energized upon closing of contacts 57 and 58.

*Operation*

The thermostatic connecting plug and household heating appliance provide a combination for electrical energization and temperature control of the heating appliance 12. Adjustment rotation of the manual knob 66 moves the lever 68 up or down to move the contact 57 up or down, thus adjusting the temperature at which the contacts open and close to de-energize and energize the heater 15. When the thermostatic connecting plug 11 is plugged on to the terminal pins 17 and 18, this permits completion of the circuit upon closing of the contacts 57 and 58 to energize the heater 15. At the same time, the cantilever spring 20 urges the heat collector washer 37 into firm heat transmitting relationship with the flat bottom surface portion 23. The heat collector washer 37 being contiguous to this flat bottom surface portion 23 and to the cantilever blade 41 permits rapid transmission of heat to this cantilever blade 41. The cantilever blade 41 is short in relation to the length of the base 32 and thus heat is rapidly transmitted to all parts of this bimetallic blade 41. Accordingly, it rapidly deflects to open the contacts and the minimization of friction in the moving parts of the thermostatic switch 31 permits a very small temperature differential. This minimum friction within the thermostatic switch 31 is caused by the line contact abutment between the cantilever blade 41 and the insulator push link 51 and between this push link 51 and the third cantilever blade 43. Accordingly, this minimum of friction and a good heat transmission from the bottom wall 13 to the bimetallic blade 41 permits a rapid response to temperature changes and a minimum temperature differential between contact opening and contact closing. It has been found in tests that the temperature of the bottom wall of the electric skillet 13, taken at the center of this bottom wall by means of a thermocouple, can be held within plus or minus six degrees of the preset temperature range with a temperature at the bimetal blade 41 itself held within plus or minus two degrees. Further, the difference in temperature between the pan bottom center and the bimetal 41 is only about 15–18 degrees, even at a high temperature setting of 425 degrees. Thus, should the heating appliance 12 boil dry, for example, and the temperature thereof rapidly increase, the bimetal temperature will also rapidly increase, being only in the order of 15–18 degrees lower in temperature to thus quickly change the cycling periods of the contacts to a much longer off time to thus hold the electrical appliance temperature within a safe operating range.

The adjusting knob 66 is on the same side of the plug 11 as the heat collector washer 37 which is an advantage in having all operating parts on the single upper side of the plug 11 for ease of operation and observation of proper functioning. Also, it is an advantage to the housewife in ease of insertion of the plug 11 onto the pin terminals 17 and 18 because she can observe the heat collector washer 37 on the top of the housing 27, and this heat collector washer 37 helps the housewife center the plug 12 for easy insertion onto the terminal pins 17 and 18. The heat collector washer 37 extends only slightly above the forward end of the housing 27 in the order of $\frac{1}{4}$ to $\frac{1}{10}$ the diameter of this washer 37. This means that the heat collector washer 37, which is the part which replaces the probe of the prior art thermostatic connecting plugs, is a very rugged metallic element which cannot be bent or broken. Also, the upper surface of this heat collector washer 37 is flat and engages the flat bottom surface portion 23. Thus, there is no probe extending from either the connecting plug 11 or heating appliance 12 to be broken, bent or damaged in use or in cleaning. Also, since both the heat collector washer 37 and bottom surface portion 23 are flat and essentially coplanar with surrounding surfaces, they are easily maintained in a clean condition. This makes it easy for the housewife to keep these clean, assures that they will be kept clean and thus the calibration of the thermostatic connecting plug 11 may be maintained much more nearly constant throughout the life of the entire combined connecting plug and heating appliance 12.

In many prior art thermostatic connecting plugs, such as those utilizing probes, for example, the temperature calibration changed considerably during its life. As an example, the difference in temperature between the pan center bottom and the temperature responsive element in the thermostatic connecting plug might be fifty degrees at a preset temperature of 350 degrees for the pan. The calibrated knob would be set for 350 degrees with an actual temperature of 300 degrees at the temperature responsive element. This would be the calibrated setting when new as it left the factory. As the frying pan and plug were used, however, changes would inevitably occur, including bending of the probe and dirt or foreign objects on the probe or in the mating socket. These changes would decrease and impair heat transmission, resulting in perhaps a 100 degree difference in temperature between the pan bottom center and the temperature responsive element in the plug. This would mean that for a 350 degree setting of the knob, the actual pan temperature would be about 400 degrees. This would cause much more sticking and burning of the food, and cause considerable dissatisfaction with the electrical appliance, and poor customer relations. The housewife often would not realize that the pan was operating at a higher temperature than indicated, and would not reduce the temperature setting from those recommended for the particular cooking operation. The present combination maintains a considerably more constant temperature calibration throughout life because of much greater ease in cleaning and the smooth, flat surfaces not collecting dirt in the first place. Also, the ruggedness of construction of the heat sensing or collecting washer 37 materially aids in maintaining this uniform temperature calibration.

The entire household heating appliance 12 may be made immersible in water and since there is no probe extending from this heating appliance 12, it will not become damaged during washing as by bumping against the rim of the sink or against the faucet spout. The flat bottom surface portion 23 may easily be kept clean during washing. The thermostatic connecting plug 11 has a smooth external appearance and the plug 11 need normally not be cleaned at all, but could easily be cleaned by a damp cloth which would keep the heat collector washer 37 clean and free from any food or foreign substances.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermostatic switch for an electrical heater to heat a utensil having a flat surface portion,
    said thermostatic switch including a housing,
    a base within said housing,
    said housing having a surface portion with an aperture therein,
    a heat collector member of good heat conductive metal carried by said base,
    a bimetallic member carried by said base contiguous to said heat collector member and being positioned within said housing,
    first and second contacts carried on said thermostatic switch and relatively moved by movement of said bimetallic member,
    adjustment means extending through said housing surface portion to relatively adjust said contacts,
    said heat collector member extending through said aperture in said housing surface portion in the same direction as said adjustment means to a level slightly beyond said surface portion,
    said heat collector member having a major dimension which is the largest dimension of said heat collector member, said major dimension being substantially contiguous with said bimetallic member, the heat flow through said heat collector member being substantially transverse to said major dimension,
    and conductor means to connect said contacts to a voltage source to control energization to the electrical heater.

2. A thermostatic switch for a heating appliance having an electrical heater element and a flat surface portion,
    said thermostatic switch including an insulating housing,
    a metal base within said housing,
    said housing having a surface portion with an aperture therein,
    a heat collector member of good heat conductive metal carried by said base,
    a bimetallic blade carried by said base contiguous to said heat collector member and being positioned within said housing,
    first and second contacts carried by said thermostatic switch and relatively moved by movement of said bimetallic blade,
    a rotatable adjusting knob exterior of said housing on the side thereof having said aperture and connected to relatively move said contacts,
    said heat collector member extending through said aperture in said housing surface portion in the direction toward said knob to a level slightly beyond said surface portion,
    said heat collector member having a major dimension which is the largest dimension of said heat collector member, said major dimension being substantially contiguous with said bimetallic member, the heat flow through said heat collector member being substantially transverse to said major dimension,
    and conductor means to connect said contacts to a voltage source to control energization to the electrical heater element.

3. A thermostatic connecting plug for a household heating appliance having an electrical heater element with a pair of parallel terminal pins disposed on either side of a flat surface portion,
    said thermostatic connecting plug including an insulating housing,
    a thermostat within said housing,
    said thermostat having a metal base,
    said housing having a surface portion with an aperture therein,
    a heat collector member of good heat conductive metal carried by said base,
    a bimetallic blade carried by said base contiguous to said heat collector member and being positioned within said housing,
    first and second contacts carried on said thermostat and relatively moved by movement of said bimetallic blade,
    a rotatable adjusting knob exterior of said housing on the side thereof having an aperture and connected to relatively move said contacts,
    said heat collector member extending slightly through said aperture in said housing surface portion to a level beyond said surface portion and extending in the direction from said housing surface portion toward said knob,
    said heat collector member having a major dimension which is the largest dimension of said heat collector member, said major dimension being substantially contiguous with said bimetallic member, the heat flow through said heat collector member being substantially transverse to said major dimension,
    first and second connector jacks in the forward end of said housing for engagement with the heater element terminal pins on the household appliance,
    and conductor means to connect said connector jacks through said contacts to a voltage source.

4. A thermostatic connecting plug for a household heating appliance having an electrical heater element with a pair of parallel terminal pins disposed on either side of a flat surface portion,
    said thermostatic connecting plug including an insulating housing,
    a thermostat within said housing,
    said thermostat having a metal base,
    said housing having a surface portion with an aperture therein,
    a heat collector member of good heat conductive metal carried on said base and extending through said aperture in said housing surface portion to a level beyond said surface portion,
    a bimetallic blade carried on said base contiguous to said heat collector member and being positioned within said housing,
    first and second contacts carried on said thermostat and relatively moved by movement of said bimetallic blade,
    a rotatable adjusting shaft in said base extending through the surface portion of said housing having said aperture and connected to relatively move said contacts upon rotation of said shaft,
    an adjustment knob on said adjustment shaft exterior of said housing on the same side as said heat collector member,
    first and second connector jacks in the forward end of said housing for engagement with the heater element terminal pins on the household appliance,
    conductor means to connect said connector jacks through said contacts to a voltage source,
    and said heat collector member adapted to be in firm heat transmitting relationship with the flat surface portion of the household appliance upon the terminal pins being received in said connector jacks whereby heat from the appliance collected by said heat collector member controls the opening and closing temperatures of said contacts.

5. A thermostatic connecting plug for a household heating appliance having an electrical heater element with a pair of parallel terminal pins disposed on either side of a flat surface portion,
    said thermostatic connecting plug including an insulating housing,
    a thermostat within said housing,
    said thermostat having a metal base,
    said housing having a surface portion with an aperture therein,
    a heat collector member of good heat conductive metal carried on said base and extending through said aperture in said housing surface portion to a level beyond said surface portion, a bimetallic blade carried on said base contiguous to said heat collector member and being positioned within said housing, first and second contacts carried on said thermostat and relatively moved by movement of said bimetallic blade, a rotatable adjusting shaft in said base extending through the surface portion of said housing having said aperture and connected to relatively move said contacts upon rotation of said shaft, an adjustment knob on said adjustment shaft exterior of said housing on the same side as said heat collector member, first and second connector jacks in the forward end of said housing for engagement with the heater element terminal pins on the household appliance, conductor means to connect said connector jacks through said contacts to a voltage source, and said heat collector member adapted to be in firm heat transmitting relationship with the flat surface portion of the household appliance upon the terminal pins being received in said connector jacks whereby heat from the appliance collected by said heat collector member controls the opening and closing temperatures of said contacts.

6. A thermostatic connecting plug for a household heating appliance having an electrical heater element with a pair of parallel terminal pins disposed on either side of a flat bottom surface portion, said thermostatic connecting plug including an insulating housing, a thermostat within said housing, said thermostat having a metal base, said housing having an upper surface portion with an aperture therein, a heat collector washer of good heat conductive metal carried on said base and extending through said aperture in said housing upper surface portion to a position parallel to and above said surface portion a distance in the order of one-fourth to one-tenth the diameter thereof, a bimetallic blade insulatively carried on said base contiguous to and below said heat collector washer and being positioned within said housing, first and second contacts carried on said thermostat and relatively moved by movement of said bimetallic blade, an adjusting screw in said base and extending through the upper surface of said housing, a lever fulcrumed relative to said base and connected to be moved by said screw to relatively move said contacts, an adjustment knob on said adjustment screw exterior of said housing on the same side as said heat collector washer, first and second connector jacks in the forward end of said housing for engagement with the heater element terminal pins on the household appliance, and conductor means to connect said connector jacks through said contacts to a voltage source.

7. In combination a thermostatic connecting plug and a household heating appliance;

said heating appliance including an electrical heater element having a pair of parallel terminal pins disposed on either side of a flat bottom surface portion;

said thermostatic connecting plug including an insulating housing, a thermostat within said housing, said thermostat having a metal base, a stack carried on said base at a forward end of said housing, a rivet fastening said stack to said base, said housing having an upper surface portion with an aperture therein, a heat collector washer of good heat conductive metal at the upper end of said stack extending through said aperture in said housing upper surface portion to a level above said surface portion, a bimetallic blade in said stack contiguous to and below said heat collector washer and being positioned within said housing, first and second contacts carried on said thermostat and relatively moved by movement of said bimetallic blade, an adjusting screw in said base and extending through the upper surface of said housing, a lever fulcrumed relative to said base and connected to be moved by said screw to relatively move said contacts, an adjustment knob on said adjustment screw exterior of said housing on the same side as said heat collector washer, first and second connector jacks in the forward end of said housing for engagement with said heater element terminal pins on said household appliance, conductor means to connect said connector jacks through said contacts to a voltage source, and spring means interconnecting said appliance and said plug to urge said heat collector washer into firm heat transmitting relationship with said bottom surface portion of said household appliance upon said terminal pins being received in said connector jacks whereby heat from said appliance collected by said heat collector washer controls the opening and closing temperatures of said contacts.

8. In combination a thermostatic connecting plug and a household heating appliance;

said heating appliance including an electrical heater element having a pair of parallel terminal pins disposed on either side of a surface portion;

said thermostatic connecting plug including an insulating housing, a thermostat within said housing, said thermostat having a metal base, said housing having a surface portion with an aperture therein, a heat collector member of good heat conductive metal carried by said base and extending through said aperture in said housing surface portion to a level beyond said surface portion, a bimetallic blade carried on said base contiguous to said heat collector member and being positioned within said housing, first and second carried on said base and relatively moved by movement of said bimetallic blade, an adjustment knob exterior of said housing on the same side as said heat collector member and connected to relatively move said contacts, first and second connector jacks in the forward end of said housing for engagement with said heater element terminal pins on said household appliance, a two-wire supply cable connected through said contacts to said connector jacks, and spring means interconnecting said appliance and said plug to urge said heat collector member into heat transmitting relationship with said surface portion of said household appliance upon said terminal pins being received in said connector jacks, whereby heat from said appliance collected by said heat collector member controls the opening and closing temperatures of said contacts.

9. In combination a thermostatic connecting plug and a household heating appliance;

said heating appliance including an electrical heater element having a pair of parallel terminal pins disposed on either side of a flat bottom surface portion, cantilever spring means disposed between said terminal pins and fixed to said household appliance to face outwardly from said household appliance between said terminal pins, said thermostatic connecting plug including upper and lower insulating housing halves complementary to each other to form a complete housing, a thermostat within said housing, said thermostat having a metal base, a stack carried on said base at a forward end of said housing, first and second blades carried in said stack, a rivet fastening said blades in said stack to said base, said housing having an upper surface portion with an aperture therein, a heat collector washer of good heat conductive metal at the upper end of said stack extending through said aperture in said housing upper surface portion to a level above said surface portion, said first blade being bimetallic and positioned immediately contiguous to and below said heat collector washer and being positioned within said housing, first and second contacts carried on said thermostat and moved by relative movement of said first and second blades for cooperation for control of current therethrough, an upwardly extending U-shaped end on said base opposite said stack, an adjusting screw in said base U-shaped end and extending through said upper housing half and having an axis generally parallel to said stack, a motion amplifying lever fulcrumed in said U-shaped end and having an outer end with an insulator tip bearing on the rear face of said second contact blade, a guide pin on said base near said contacts passing through an aperture in said lever guiding movement of said lever parallel to the axis of said stack, an adjustment knob on said adjustment screw exterior of said housing on the same side as said heat collector washer, said adjusting screw engaging said lever for relative adjustment of said contacts, first and second connector jacks in the forward end of said housing for engagement with said heater element terminal pins on said household appliance, said cantilever spring means receiving the forward end of said housing between said spring and the under side of said household appliance to urge said heat collector washer into firm heat conducting relationship with said bottom surface portion of said household appliance, and a two-wire supply cable connected through said contacts to said connector jacks whereby heat from said appliance collected by said heat collector washer controls the opening and closing temperatures of said contacts.

10. In combination a thermostatic connecting plug and a household heating appliance, said heating appliance including an electrical heater element having a pair of parallel terminal pins disposed on either side of a flat bottom surface portion, a Z-shaped cantilever spring disposed between said terminal pins and fixed to said household appliance with an outer leg facing outwardly from said household appliance between said terminal pins, said thermostatic connecting plug including upper and lower insulating housing halves complementary to each other to form a complete housing, a thermostat within said housing, said thermostat having a metal base, a stack carried on said base at a forward end of said housing, first, second and third cantilever blades carried in that order in said stack, a rivet fastening said blades in said attack to said base, said housing having a planar upper surface portion with a circular aperture therein, a heat collector circular washer of good heat conductive metal at the upper end of said stack extending through said aperture in said housing upper surface portion to a level above said surface portion, said first blade being positioned immediately contiguous to and below said heat collector washer and being positioned within said housing, said first blade being bimetallic, cooperating contacts carried on said second and third blades for cooperative engagement for control of current therethrough, a push link between said first and third blades for movement of said third blade with said bimetal blade, an upwardly extending U-shaped end on said base opposite said stack, an adjusting screw in said base U-shaped end and extending through said upper housing half and having an axis generally parallel to said stack, a motion amplifying lever fulcrumed in said U-shaped end and having an outer end with an insulator tip bearing on the rear face of said second contact blade, a guide pin on said base near said contacts passing through an aperture in said lever guiding movement of said lever parallel to the axis of said stack, an adjustment knob on said adjusting screw exterior of said housing on the same side as said heat collector washer, said adjusting screw engaging said lever for relative adjustment of said contacts, first and second connector jacks in the forward end of said housing for engagement with said heater element terminal pins on said household appliance, said outer leg of said Z-shaped spring receiving the forward end of said housing between said spring and the under side of said household appliance to urge said heat collector washer into firm heat conducting relationship with said bottom surface portion of said household appliance, and a two-wire supply cable connected through said contacts to said connector jacks whereby heat from said appliance collected by said heat collector washer controls the opening and closing temperatures of said contacts.

References Cited by the Examiner

UNITED STATES PATENTS

| | | | |
|---|---|---|---|
| 1,813,267 | 7/1931 | Arnesen | 200—136 |
| 2,641,668 | 6/1953 | Larocce | 200—138 |
| 2,741,682 | 4/1956 | Schwaneke et al. | 200—139 X |
| 2,856,508 | 10/1958 | Kueser | 219—442 |
| 3,064,102 | 11/1962 | Cassidy | 200—136 X |
| 3,097,289 | 7/1963 | Clark | 219—44 |

BERNARD A. GILHEANY, *Primary Examiner.*

L. A. WRIGHT, T. D. MACBLAIN, *Assistant Examiners.*